US006987797B2

(12) United States Patent
Fernandez-Corbaton et al.

(10) Patent No.: US 6,987,797 B2
(45) Date of Patent: Jan. 17, 2006

(54) NON-PARAMETRIC MATCHED FILTER RECEIVER FOR WIRELESS COMMUNICATION SYSTEMS

(75) Inventors: Ivan Jesus Fernandez-Corbaton, San Diego, CA (US); John Smee, San Diego, CA (US); Srikant Jayaraman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 10/206,631

(22) Filed: Jul. 26, 2002

(65) Prior Publication Data

US 2004/0017846 A1 Jan. 29, 2004

(51) Int. Cl.
*H04B 1/707* (2006.01)

(52) U.S. Cl. ........................ 375/148; 375/152; 375/350

(58) Field of Classification Search ................. 375/142, 375/143, 144, 148, 150, 152, 340, 343, 346, 375/350, 232, 233, 145, 149; 370/320, 335, 370/342, 441
See application file for complete search history.

(56) References Cited

U.S. PATENT DOCUMENTS 5,572,552 A * 11/1996 Dent et al. .................. 375/343
5,761,088 A * 6/1998 Hulyalkar et al. .......... 348/614
6,151,358 A * 11/2000 Lee et al. ................... 375/232
6,363,104 B1 * 3/2002 Bottomley .................. 375/148
6,404,806 B1 * 6/2002 Ginesi et al. ............... 375/222
6,438,161 B1 * 8/2002 Farhang-Boroujeny et al. .......................... 375/229
6,504,884 B1 * 1/2003 Zvonar ....................... 375/346
6,570,918 B1 * 5/2003 Rademacher ............... 375/232
2003/0043887 A1 * 3/2003 Hudson ...................... 375/144
2003/0063654 A1 * 4/2003 Onggosanusi et al. .......................... 375/130

FOREIGN PATENT DOCUMENTS

EP 1128569 A1 8/2001
EP 1176733 A1 1/2002

* cited by examiner

*Primary Examiner*—Don N. Vo
(74) *Attorney, Agent, or Firm*—Philip Wadsworth; Sandra L. Godsey; Kent D. Baker

(57) ABSTRACT

A non-parametric matched filter receiver that includes a digital (e.g., FIR) filter and a channel estimator. The channel estimator (1) determines the timing to center the digital filter, (2) obtains the characteristics of the noise in received samples, (3) estimates the system response for the samples using a best linear unbiased (BLU) estimator, a correlating estimator, or some other type of estimator, and (4) derives a set of coefficients for the digital filter based on the estimated system response and the determined noise characteristics. The correlating estimator correlates the samples with their known values to obtain the estimated system response. The BLU estimator pre-processes the samples to whiten the noise, correlates the whitened samples with their known values, and applies a correction factor to obtain the estimated system response. The digital filter then filters the samples with the set of coefficients to provide demodulated symbols.

26 Claims, 7 Drawing Sheets

NON-PARAMETRIC MATCHED FILTER RECEIVER FOR WIRELESS COMMUNICATION SYSTEMS

BACKGROUND

1. Field

The present invention relates generally to data communication, and more particularly to a non-parametric matched filter receiver for use in wireless communication systems.

2. Background

Wireless communication systems are widely deployed to provide various types of communication such as voice, packet data, and so on. These systems may be multiple-access systems capable of supporting communication with multiple users and may be based on code division multiple access (CDMA), time division multiple access (TDMA), frequency division multiple access (FDMA), or some other multiple access techniques. These systems may also be wireless local area network (LAN) systems, such as those that conform to the IEEE standard 802.11b.

A receiver in a CDMA system typically employs a rake receiver to process a modulated signal that has been transmitted over a wireless communication channel. The rake receiver normally includes a searcher element and a number of demodulation elements, which are commonly referred to as "searcher" and "fingers," respectively. Due to the relatively wide bandwidth of a CDMA waveform, the communication channel is assumed to be composed of a finite number of resolvable multipath components. Each multipath component is characterized by a particular time delay and a particular complex gain. The searcher then searches for strong multipath components in the received signal, and fingers are assigned to the strongest multipath components found by the searcher. Each finger processes its assigned multipath component to provide symbol estimates for that multipath component. The symbol estimates from all assigned fingers are then combined to provide the final symbol estimates. The rake receiver can provide acceptable performance for CDMA systems operated at low signal-to-interference-and-noise ratios (SINRs).

The rake receiver has a number of shortcomings. First, the rake receiver can provide unsatisfactory performance under certain channel conditions. This results from the rake receiver's inability to accurately model certain types of channels and to handle multipath components with time delays separated by less than one chip period. Second, a complicated searcher is normally needed to search the received signal to find strong multipath components. Third, a complicated control unit is also normally needed to decide if multipath components are present in the received signal (i.e., if they are of sufficient strength), assign fingers to newly found multipath components, de-assign fingers from vanishing multipath components, and support the operation of the assigned fingers. Because of the high sensitivity needed to find weak multipath components and the need for a small false alarm rate (i.e., declaring a multipath component to exist when in fact it does not), the searcher and control unit are normally quite complex.

There is therefore a need in the art for a receiver structure that can ameliorate the shortcomings noted above for the rake receiver.

SUMMARY

A non-parametric matched filter receiver is provided herein that can provide various advantages over the conventional rake receiver, including improved performance for various types of channels (e.g., fat path channel) and reduced complexity. The non-parametric matched filter receiver does not make any assumption about the form of the communication channel or the response of the system, and hence the name "non-parametric."

In an embodiment, the non-parametric matched filter receiver includes a digital (e.g., finite impulse response (FIR)) filter and a channel estimator. The channel estimator initially determines the timing corresponding to the approximate center for a large portion (or the bulk) of the energy in the received signal, which may be the timing of the strongest multipath component found in the received signal, the center of the energy mass in the received signal, and so on. This timing is used to center the digital filter. The channel estimator also obtains the characteristics of the noise in the received samples derived from the received signal. The noise may be characterized by an autocorrelation matrix.

The channel estimator then estimates the system response for the received samples using, for example, a best linear unbiased (BLU) estimator, a correlating estimator, or some other type of estimator. For the correlating estimator, the received samples are correlated with known values for these samples to obtain the estimated system response. For the BLU estimator, the received samples are pre-processed to approximately whiten the noise, then correlated with known values for these samples to obtain correlated result, which is further applied with a correction factor to obtain the estimated system response. The correction factor accounts for coloration of the noise and may be pre-computed.

The channel estimator then derives a set of coefficients for the digital filter based on the estimated system response and the determined noise characteristics. The digital filter then filters the received samples with the set of coefficients to provide demodulated symbols.

Various aspects and embodiments of the invention are described in further detail below. The invention further provides methods, program codes, digital signal processors, integrated circuits, receiver units, terminals, base stations, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
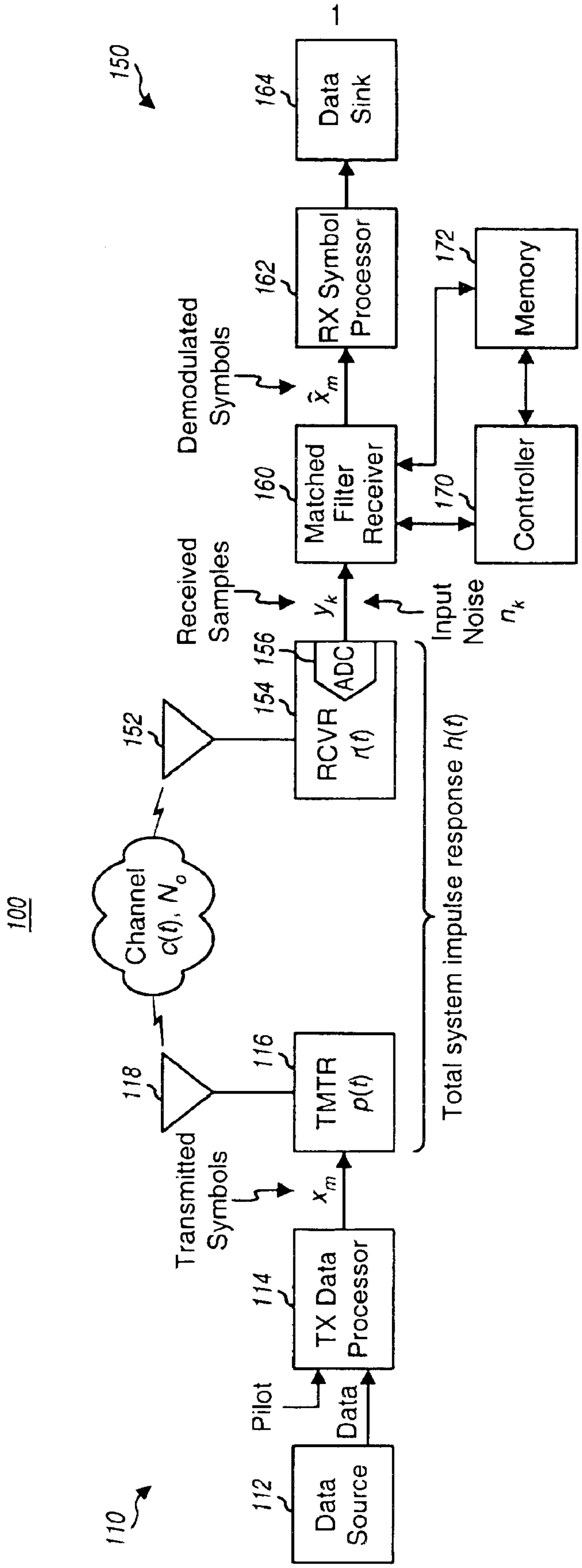
FIG. 1 is a block diagram of a transmitter system and a receiver system in a wireless (e.g., CDMA) communication system.

FIG. 1 is a block diagram of a transmitter system 110 and a receiver system 150 in a wireless communication system 100. At transmitter system 110, traffic data is provided from a data source 112 to a transmit (TX) data processor 114. TX data processor 114 formats, codes, and interleaves the traffic data to provide coded data. Pilot data may be multiplexed with the coded data using, for example, time multiplexing or code multiplexing. The pilot data is typically a known data pattern that is processed in a known manner (if at all), and may be used by the receiver system to estimate the channel and system responses.

The multiplexed pilot and coded data is then modulated (i.e., symbol mapped) based on one or more modulation schemes (e.g., BPSK, QSPK, M-PSK, or M-QAM) to provide modulation symbols. Each modulation symbol corresponds to a specific point on a signal constellation corresponding to the modulation scheme used for that symbol. The modulation symbols may further be processed as defined by the communication system being implemented. For a CDMA system, the modulation symbols may further be repeated, channelized with an orthogonal channelization code, spread with a pseudo-random noise (PN) sequence, and so on. TX data processor 114 provides "transmitted symbols" $\{x_m\}$ at a symbol rate of 1/T, where T is the duration of one transmitted symbol.

A transmitter unit (TMTR) 116 then converts the transmitted symbols into one or more analog signals, and further conditions (e.g., amplifies, filters, and frequency upconverts) the analog signals to generate a modulated signal. The result of all of the processing by transmitter unit 116 is that each transmitted symbol $x_m$ is effectively represented by an instance of a transmit shaping pulse p(t) in the modulated signal, with the pulse instance being scaled by the complex value of that transmitted symbol. The modulated signal is then transmitted via an antenna 118 and over a wireless communication channel to receiver system 150.

At receiver system 150, the transmitted modulated signal is received by an antenna 152 and provided to a receiver unit (RCVR) 154, which conditions (e.g., amplifies, filters, and frequency downconverts) the received signal. An analog-to-digital converter (ADC) 156 within receiver unit 154 then digitizes the conditioned signal at a sample rate of $1/T_s$ to provide ADC samples. The sample rate is typically higher (e.g., two, four, or eight times higher) than the symbol rate. The ADC samples may further be digitally pre-processed (e.g., filtered, interpolated, sample rate converted, and so on) within receiver unit 154. Receiver unit 154 provides "received samples" $\{y_k\}$, which may be the ADC samples or the pre-processed samples.

A non-parametric matched filter receiver 160 then processes the received samples $\{y_k\}$ to provide demodulated symbols $\{\hat{x}_m\}$, which are estimates of the transmitted symbols $\{x_m\}$. The processing by matched filter receiver 160 is described in further detail below. An RX symbol processor 162 further processes (e.g., despreads, decovers, deinterleaves, and decodes) the demodulated symbols to provide decoded data, which is then provided to a data sink 164. The processing by RX symbol processor 162 is complementary to the processing performed by TX data processor 114.

A controller 170 directs the operation at the receiver system. A memory unit 172 provides storage for program codes and data used by controller 170 and possibly other units within the receiver system.

The signal processing described above supports transmissions of various types of traffic data (e.g., voice, video, packet data, and so on) in one direction from the transmitter system to the receiver system. A bi-directional communication system supports two-way data transmission. The signal processing for the reverse path is not shown in FIG. 1 for simplicity. The processing shown in FIG. 1 can represent either the forward link (i.e., downlink) or the reverse link (i.e., uplink) in a CDMA system. For the forward link, transmitter system 110 can represent a base station and receiver system 150 can represent a terminal.

In an aspect, a non-parametric matched filter receiver that employs a matched filter is used to process the received samples to provide demodulated symbols. The non-parametric matched filter receiver (which is also referred to as a matched filter receiver or demodulator) does not make any assumption about the form of the communication channel or the system response, and hence the name "non-parametric".

ANALYSIS

For clarity, in the following analysis for the non-parametric matched filter receiver, the subscript "m" is used for symbol index and the subscript "k" is used for sample index. Continuous time signals and responses are expressed using "t", such as h(t) or h(t−kT). Boldfaced upper-case letters are used to denote matrices (e.g., X), and boldfaced lower-case letters are used to denote vectors (e.g., y).

As used herein, a "sample" corresponds to a value at a particular sample instant for a particular point in the receiver system. For example, the analog-to-digital converter (ADC) within receiver unit 154 digitizes the conditioned signal to provide ADC samples, which may or may not be pre-processed (e.g., filtered, sample rate converted, and so on) to provide received samples $\{y_k\}$. A "symbol" corresponds to a unit of transmission at a particular time instant for a particular point in the transmitter system. For example, TX data processor 114 provides transmitted symbols $\{x_m\}$, each of which corresponds to one signaling period using the transmit shaping pulse p(t).

As shown in FIG. 1, the transmitter system transmits a sequence of symbols $\{x_m\}$ to the receiver system. Each symbol $x_m$ is transmitted using the shaping pulse p(t) through a linear communication channel having an impulse response of c(t). Each transmitted symbol is further corrupted by the channel's additive white Gaussian noise (AWGN), which has a flat power spectral density of $N_o$ (Watts/Hz).

At the receiver, the transmitted symbols are received, conditioned, and provided to the ADC. All of the signal conditioning at the receiver prior to the ADC may be lumped into a receiver impulse response of r(t). The signal at the input to the ADC may then be expressed as:

$$y(t) = \sum_m x_m \cdot h(t - mT) + n(t), \quad \text{Eq (1)}$$

where T is a symbol period, n(t) is the noise observed at the ADC input, and h(t) is the total system impulse response, which may be expressed as:

$$h(t)=p(n)*c(t)*r(t), \quad \text{Eq(2)}$$

where "*" denotes a convolution. The total system impulse response h(t) thus includes the responses for the transmit pulse, the channel, and the receiver signal conditioning.

The transmitted symbol sequence $\{x_m\}$ is assumed to have a zero mean and to be independent and identically distributed (iid). Moreover, at least a portion of the transmitted symbol sequence is known a priori at the receiver, with the known portion corresponding to a pilot or "training" sequence.

The signal conditioning with the impulse response of r(t) at the receiver "colors" the white Gaussian input noise at the receiver antenna. This then results in a Gaussian process with an autocorrelation function $r_{nn}(\tau)$ given by:

$$r_{nn}(\tau)=N_o(r(\tau)*r^*(-\tau)), \quad \text{Eq(3)}$$

where "$r^*$" denotes the complex conjugate of r. As used herein, "color," "colored," and "coloration" refer to any process that is not AWGN.

The ADC is operated at a sample rate of $1/T_s$ and provides received samples, which may be expressed as:

$$y(kT_s)=\sum_m x_m \cdot h(kT_s-mT)+n(kT_s). \quad \text{Eq (4a)}$$

For simplicity, $y(kT_s)$ and $n(kT_s)$ are also denoted as $y_k$ and $n_k$, respectively.

In general, the sample rate $1/T_s$ for the ADC may be any arbitrary rate and does not need to be synchronized to the symbol rate. Typically, the sample rate is selected to be higher than the symbol rate to avoid aliasing of the signal spectrum. However, for simplicity, the following analysis assumes that the sample rate is chosen to be equal to the symbol rate (i.e., $1/T_s=1/T$). This analysis may be extended for any arbitrary sample rate with slightly more complicated notation and derivations.

For a sample rate of 1/T, the ADC samples in equation (4a) may be expressed as:

$$y(kT)=\sum_m x_m \cdot h(kT-mT)+n(kT). \quad \text{Eq (4b)}$$

For a particular number of received samples, equation (4b) may also be rewritten in a more compact matrix form, as follows:

$$y=Xh+n, \quad \text{Eq(5)}$$

where y and n are each a column vector of size P and are defined as follows:

$$\underline{y}=\begin{bmatrix} y(kT) \\ \vdots \\ y((k+P-1)T) \end{bmatrix}, \quad \underline{n}=\begin{bmatrix} n(kT) \\ \vdots \\ n((k+P-1)T) \end{bmatrix},$$

X is a (P×(L+1)) matrix defined as follows:

$$\underline{X}=\begin{bmatrix} x_{k-L/2} & \cdots & x_k & \cdots & x_{k+L/2} \\ x_{k-L/2+1} & \cdots & x_{k+1} & \cdots & x_{k+L/2+1} \\ \vdots & \ddots & \vdots & \ddots & \vdots \\ x_{k-L/2+P-1} & \cdots & x_{k+P-1} & \cdots & x_{k+L/2+P-1} \end{bmatrix},$$

and h is a column vector of size L+1 defined as follows:

$$\underline{h}=\begin{bmatrix} h(-TL/2) \\ \vdots \\ h(0) \\ \vdots \\ h(TL/2) \end{bmatrix}.$$

The elements of the matrix X are values for the transmitted symbols and therefore do not include T. The elements in the vectors y, h, and n are sampled values, and this is denoted by T.

Each row of the matrix X includes L+1 transmitted symbols that can be multiplied with the L+1 elements of the vector h. Each successively higher indexed row of the matrix X includes a set of transmitted symbols that is offset by one symbol period from the set of transmitted symbols for the preceding row. The matrix X can thus be derived from a vector x of P+L transmitted symbols, which may be expressed as:

$$\underline{x}=\begin{bmatrix} x_{k-L/2} \\ \vdots \\ x_{k+L/2+P-1} \end{bmatrix}.$$

In the above, P is the number of transmitted symbols that are observed and may be used for estimation, and L+1 is the discrete length of the total system impulse response h(t). An assumption is made that h(t)=0 for $|t|\geqq TL/2$ (i.e., the impulse response h(t) has a finite time span).

For the analysis, the matched filter receiver comprises a FIR filter having a number of taps that are spaced by the symbol period T. Each tap corresponds to a received sample for a particular sample period. The coefficients of the FIR filter are estimated based on a vector of received samples y corresponding to a known training sequence. The length of the FIR filter should cover at least L+1 symbol periods so that the filter can collect a large portion of the energy in the received signal. For simplicity, the following analysis is performed for a FIR filter having L+1 taps.

An optimal matched filter that maximizes signal-to-noise ratio (SNR) in colored noise has a set of coefficients $f_o$, which may be expressed as:

$$\underline{f}_o=R_{\tilde{n}\tilde{n}}^{-1}\underline{h}, \quad \text{Eq (6)}$$

where $R_{\tilde{n}\tilde{n}}$ is an autocorrelation matrix of the colored Gaussian input noise n(kT). This matrix may be expressed as:

$$R_{\tilde{n}\tilde{n}}=E\{\tilde{n}\tilde{n}^H\}, \text{ and} \quad \text{Eq(7a)}$$

$$R_{\tilde{n}\tilde{n}}(i,j)=r_{nn}((j-i)T), \quad \text{Eq(7b)}$$

where $\tilde{n}^H$ is the complex conjugate of the transpose of the vector $\tilde{n}$, and the expectation E{ } is taken over a colored noise vector $\tilde{n}_k$ for the k-th symbol period, which is expressed as:

$$\underline{n}_k = \begin{bmatrix} n((k-L/2)T) \\ \vdots \\ n((k+L/2)T) \end{bmatrix}.$$

An objective of the matched filter receiver is then to obtain an estimate of the set of coefficients $f_o$ for the optimal matched filter. As shown in equation (6), the coefficients $f_o$ can be obtained from the autocorrelation matrix $R_{\tilde{n}\tilde{n}}$ and the total system impulse response vector h. The autocorrelation matrix $R_{\tilde{n}\tilde{n}}$ can be computed from the receiver impulse response r(t), which is typically known or can be determined, as shown in equations (3) and (7b). The vector h can be estimated based on (1) known symbols (e.g., pilot symbols) transmitted by the transmitter and (2) the received samples for these known symbols at the receiver. If a pilot is transmitted, then both the received values and actual values (as transmitted) for the samples are known at the receiver during each pilot or training sequence. The challenge in obtaining the coefficients $f_o$ for the optimal matched filter then reduces to the estimation of the total system impulse response h from the received sample vector y given knowledge of the corresponding transmitted symbol vector x.

From the transfer function shown in equation (5), the estimation of h based on x and y resembles a classical linear model for an unknown vector of deterministic parameters. A number of estimators may then be used to perform the estimation of h. Two channel estimators are described in detail below.

In one embodiment, a best linear unbiased (BLU) estimator is used to estimate the system response h. The estimate $\hat{h}_b$ provided by this estimator may be expressed as:

$$\hat{h}_b = (X^H R_{nn}^{-1} X)^{-1} X^H R_{nn}^{-1} y, \quad \text{Eq(8)}$$

where $R_{nn}$ is an autocorrelation matrix for the colored Gaussian input noise n(kT) obtained from the noise vector n and may be expressed as:

$$R_{nn} = E\{nn^H\}, \text{ and} \quad \text{Eq(9a)}$$

$$R_{nn}(i,j) = r_{nn}((j-i)T) \quad \text{Eq(9b)}$$

The autocorrelation matrix $R_{nn}$ shown in equations (9a) and (9b) is similar to the autocorrelation matrix $R_{\tilde{n}\tilde{n}}$ shown in equations (7a) and (7b), except that it is derived from P symbol periods instead of L+1 symbol periods.

In equation (8), the term $X^H R_{nn}^{-1} y$ represents a cross-correlation between the "whitened" received samples (which are represented by $R_{nn}^{-1}y$) and the transmitted symbols (which are represented by $X^H$). The received samples y are whitened by the matrix $R_{nn}^{-1}$ to account for the "coloration" of the input noise by the receiver impulse response r(t). The term $(X^H R_{nn}^{-1} X)^{-1}$ is a matrix that may be viewed as a correction factor for the fact that the received samples are not independent, again because of the coloration by the receiver impulse response r(t).

The performance of the BLU estimator can be quantified by a covariance matrix $R_{\Delta_b\Delta_b}$, which may be expressed as:

$$R_{\Delta_b\Delta_b} = E\{\Delta_b \Delta_b^H\} = (X^H R_{nn}^{-1} X)^{-1}, \quad \text{Eq(10)}$$

where $$\Delta_b = \hat{h}_b - h.$$

Since the input noise n is zero mean Gaussian distributed, the BLU estimator minimizes the covariance matrix $R_{\Delta_b\Delta_b}$ and is also a Maximum Likelihood (ML) and Minimum Mean Square Error (MMSE) estimator of h given y. It can be shown that equation (8) is an efficient estimator that achieves the Cramer-Rao bound.

The coefficients f for the FIR filter may be derived based on a system response estimate $\hat{h}$, as follows:

$$\underline{f} = R_{\tilde{n}\tilde{n}}^{-1} \hat{\underline{h}}. \quad \text{Eq (11)}$$

If the BLU estimator is used to estimate h, then the system response estimate $\hat{h}_b$ provided by this estimator may be substituted for $\hat{h}$ in equation (11) to obtain the coefficients f for the FIR filter.

The FIR filter is provided with the received samples y(kT) and, for each symbol period m, provides a demodulated symbol $\hat{x}_m$ which is an estimate of the m-th transmitted symbol $x_m$. The demodulated symbol may be expressed as:

$$\hat{x}_m = f^H \tilde{y}_k, \quad \text{Eq(12)}$$

where $\tilde{y}_k$ is a vector of L+1 received samples at the m-th symbol period and may be expressed as:

$$\tilde{\underline{y}}_k = \begin{bmatrix} y((k-L/2)T) \\ \vdots \\ y((k+L/2)T) \end{bmatrix}.$$

During non-training periods, the FIR filter provides one demodulated symbol for each symbol period based on the L+1 received samples $\tilde{y}_k$ contained in the FIR filter's time span for that symbol period.

The performance of the non-parametric matched filter receiver based on the filter coefficients f may be assessed. For this assessment, a signal-to-interference-and-noise ratio (SINR) as a function of the coefficients f may be defined as follows:

$$SINR(\underline{f}) = \frac{\|E_{\tilde{n},x}\{\hat{x}_m / x_m\}\|^2}{\mathrm{Var}_{\tilde{n},x}\{\hat{x}_m / x_m\}} = \frac{\|\underline{f}^H \underline{h}\|^2}{\underline{f}^H (\underline{C} + \underline{R}_{\tilde{n}\tilde{n}} - \underline{h}\underline{h}^H)\underline{f}} = \frac{\|\underline{f}^H \underline{h}\|^2}{\underline{f}^H \underline{M}\underline{f}}, \quad \text{Eq (13)}$$

where $$C(i,j) = r_{hh}((j-i)T),$$

and $r_{hh}$ is the autocorrelation function for the total system impulse response h(t) and is given by $$r_{hh}(\tau) = h(\tau) * h^*(-\tau).$$

In equation (13), the expectation for the mean in the numerator and the variance in the denominator are taken over the noise and averaged over the pilot symbols. Over an ensemble of realizations of the error vector $\Delta_b$, equation (13) describes a density function without a simple closed analytical form in the general case.

As shown in equations (8) and (11), the derivation of the filter coefficients f requires a matrix inversion for $(X^H R_{nn}^{-1} X)^{-1}$. Since this is a P×P matrix, where P may be large (e.g., in the order of hundreds or even thousands), the matrix inversion may be computationally intensive. However, this computational complexity can be avoided by using a memory to store pre-computed matrices for $(X^H R_{nn}^{-1} X)^{-1}$.

In many systems, the sequence of training symbols is derived based on a specific pseudo-random noise (PN)

sequence that repeats. The PN sequence and the training symbol sequence are both normally known at the time of the receiver design. In this case, if the estimation process is constrained to start on a set of discrete index offsets with respect to the start of the PN sequence, then only a finite set of X matrices will be needed for the estimation. Moreover, the matrix $R_{nn}$ is only dependent on the receiver impulse response of r(t). Thus, a finite number of P×P matrices may be pre-computed for $(X^H R_{nn}^{-1} X)^{-1}$ and stored in a memory (e.g., memory 172 in FIGS. 1 and 2) for later use.

In another embodiment, a "correlating" estimator is used to estimate the system response h. The correlating estimator is less complex to implement than the BLU estimator described above and can provide comparable performance for certain operating conditions. The correlating estimator provides a system response estimate $\hat{h}_d$, which may be expressed as:

$$\hat{\underline{h}}_d = \frac{X^H \underline{y}}{P}. \quad \text{Eq (14)}$$

Equation (14) may also be rewritten as:

$$\hat{\underline{h}}_d = \frac{1}{P} \sum_{l=k}^{k+P-1} x_l^* \tilde{\underline{y}}_l. \quad \text{Eq (15)}$$

The operation shown in equation (15) is commonly known as correlation or despreading, and hence the name correlating estimator. The system response estimate vector $\hat{h}_d$ can be derived by (1) multiplying each transmitted symbol $x^*(l)$ in the training sequence with a respective received sample vector $\tilde{y}_l$, (2) combining the P scaled vectors, and (3) scaling the resultant vector by 1/P to obtain $\hat{h}_d$.

It can be shown that the correlating estimator provides an unbiased estimate of h and that the error of this estimate has a covariance matrix $R_{\Delta_d\Delta_d}$ given by:

$$\underline{R}_{\Delta_d\Delta_d} = E\{\underline{\Delta}_d \underline{\Delta}_d^H\} = \frac{\underline{C} + \underline{R}_{\tilde{n}\tilde{n}} - \underline{h}\underline{h}^H}{P} = \frac{\underline{M}}{P}. \quad \text{Eq (16)}$$

Two different channel estimators have been described above. Other types of channel estimators may also be used with the non-parametric matched filter receiver, and this is within the scope of the invention.

Matched Filter Receiver Implementation

Figure 2:
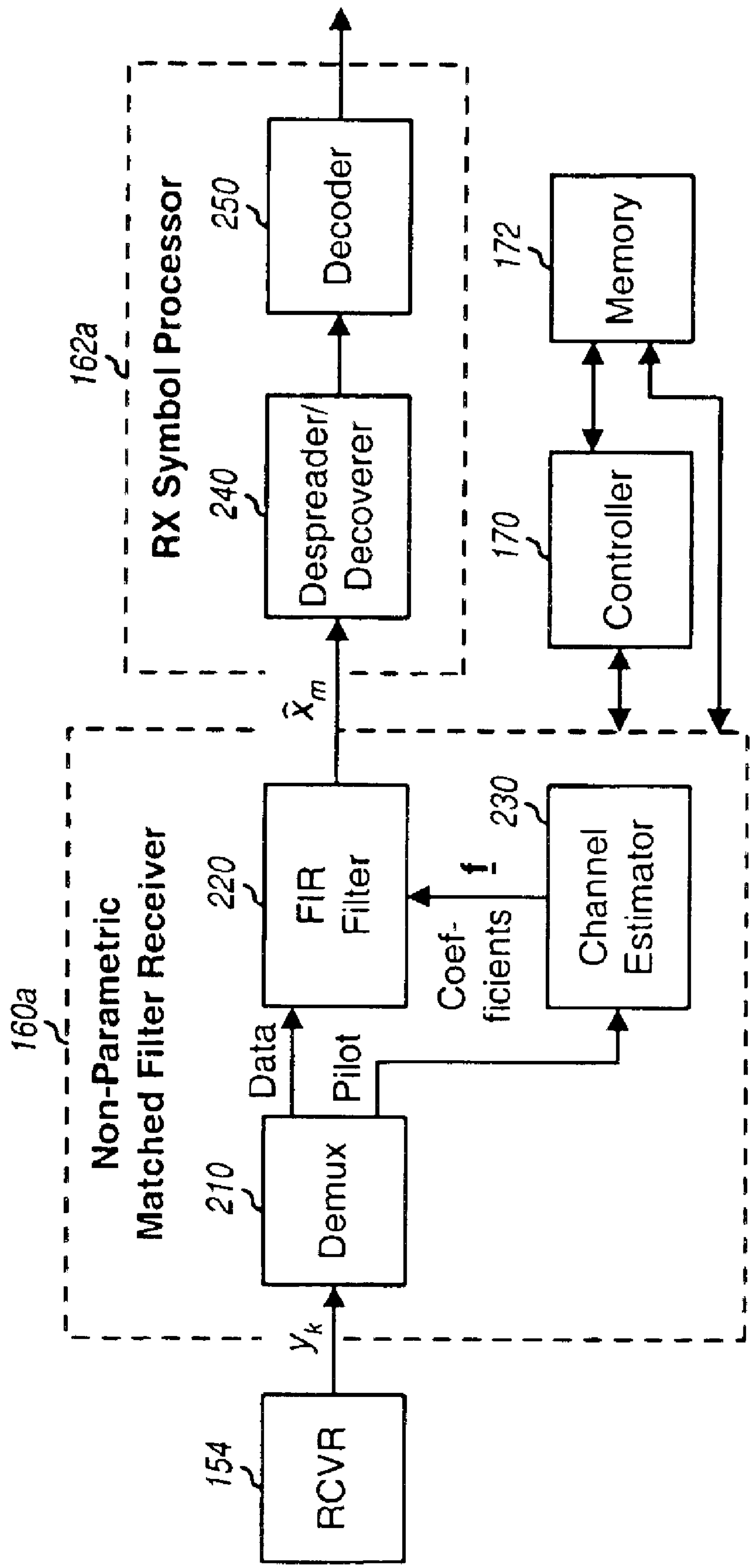
FIG. 2 is a block diagram of a non-parametric matched filter receiver and an RX symbol processor.

FIG. 2 is a block diagram of a non-parametric matched filter receiver 160*a* and an RX symbol processor 162*a*, which are one embodiment of receiver 160 and processor 162 in FIG. 1.

Within matched filter receiver 160*a*, the received samples $\{y_k\}$ from receiver unit 154 are provided to a demultiplexer (Demux) 210, which provides received samples for data symbols to a FIR filter 220 and received samples for pilot symbols to a channel estimator 230. If the pilot and data are time multiplexed, such as for the forward link in IS-856, then demultiplexer 210 can simply perform time demultiplexing of the received samples. Alternatively, if the pilot and data are code multiplexed (i.e., transmitted using different channelization codes), such as for the reverse link in IS-856, then demultiplexer 210 can perform the proper processing to obtain the samples for the pilot and data symbols, as is known in the art.

Channel estimator 230 estimates the system response based on the received samples for the pilot during training periods and provides the coefficients f for FIR filter 220. Channel estimator 230 may implement the BLU estimator, the correlating estimator, or some other estimator. Channel estimator 230 is described in further detail below.

FIR filter 220 filters the received samples for the data symbols based on the coefficients f provided by channel estimator 230. FIR filter 220 provides demodulated symbols $\{\hat{x}_m\}$, which are estimates of the transmitted symbol $\{x_m\}$.

Within RX symbol processor 162*a*, the demodulated symbols $\{\hat{x}_m\}$ are initially processed in accordance with the communication system being implemented. For a CDMA system, a despreader/decoverer 240 may despread the demodulated symbols $\{\hat{x}_m\}$ with the PN sequence used to spread the data at the transmitter, and further decover the despread symbols with the channelization code used for the data. The output from despreader/decoverer 240 is further deinterleaved and decoded by a decoder 250 to provided the decoded data.

Figure 3A:
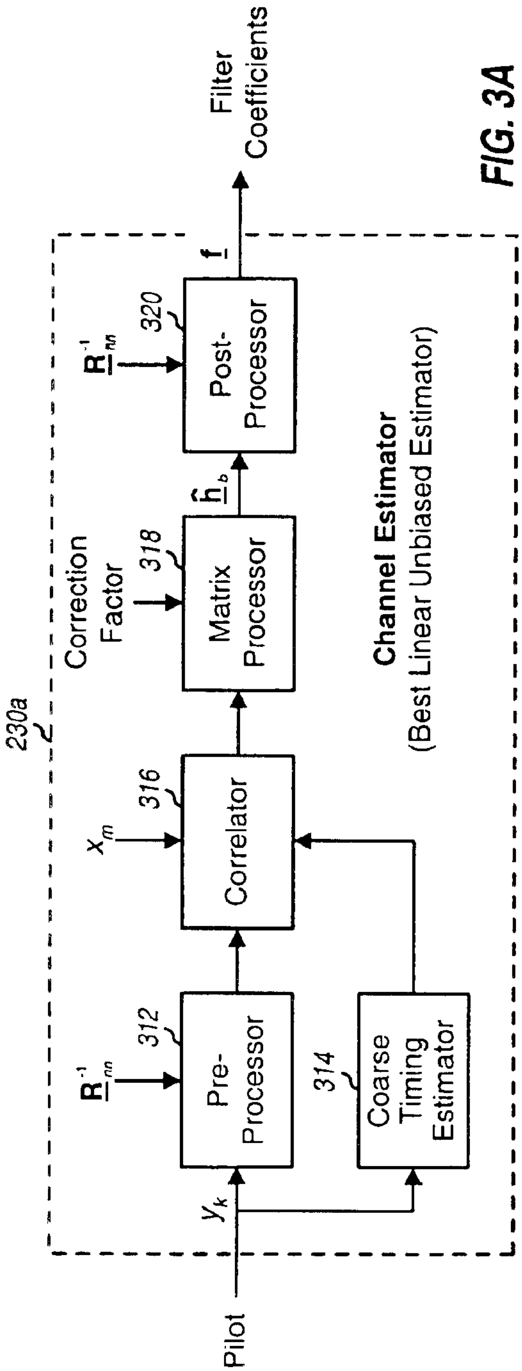
FIGS. 3A and 3B are block diagrams of two channel estimators that implement the BLU estimator and the correlating estimator, respectively.

FIG. 3A is a block diagram of a channel estimator 230*a* that implements the BLU estimator. The received samples $\{y_k\}$ for pilot symbols are provided to both a pre-processor 312 and a coarse timing estimator 314. Coarse timing estimator 314 determines an approximate time delay where a large portion of the energy resides in the received signal. In one embodiment, coarse timing estimator 314 is implemented with a searcher that searches for the strongest multipath component in the received signal. In another embodiment, coarse timing estimator 314 determines the center of the energy mass in the received signal. This energy mass center may be determined, for example, based on the condition:

$$\sum_i (t_{lag,i} \cdot E_i) = 0,$$

where $t_{lag,i}$ is the time lag between the energy mass center and the i-th signal peak (the time lag may be a positive or negative value) and $E_i$ is the energy of the i-th signal peak. The energy mass center is thus defined such that both sides of the mass center contain approximately equal amounts of energy. In general, coarse timing estimator 314 determines the timing corresponding to the approximate center for a large portion (or the bulk) of energy in the received signal. Coarse timing estimator 314 then provides a timing signal that is used to center the FIR filter.

Pre-processor 312 pre-multiplies the received sample vector y with the inverse autocorrelation matrix $R_{nn}^{-1}$ to provide the whitened received sample vector $R_{nn}^{-1}y$, as shown in equation (8). A correlator 316 then performs the cross-correlation between whitened received sample vector and the transmitted symbol vector (represented by $X^H$) to provide the correlated result $X^H R_{nn}^{-1} y$.

A matrix processor 318 then pre-multiplies the correlated result $X^H R_{nn}^{-1} y$ with the correction factor $(X^H R_{nn}^{-1} X)^{-1}$ to obtain the system response estimate $h_b$. Since $(X^H R_{nn}^{-1} X)^{-1}$ is a Toeplitz matrix, the matrix pre-multiplication may be performed using an efficient structure such as a FIR filter. A post-processor 320 further pre-multiplies the system response estimate $h_b$ with the inverse autocorrelation matrix $R_{\tilde{n}\tilde{n}}^{-1}$ to obtain the coefficients for the FIR filter, as shown in equation (11).

Figure 3B:
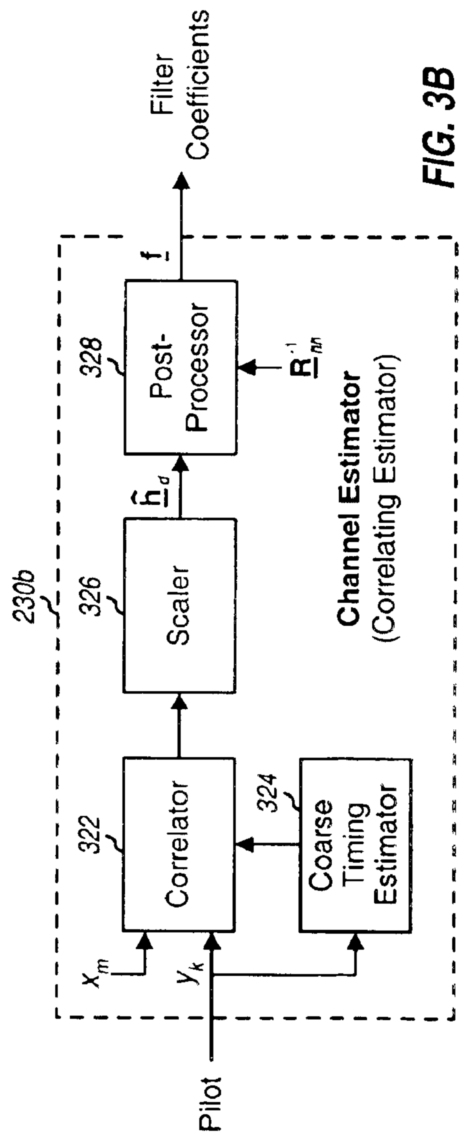

FIG. 3B is a block diagram of a channel estimator 230*b* that implements the correlating estimator. The received samples $\{y_k\}$ for pilot symbols are provided to both a correlator 322 and a coarse timing estimator 324. Coarse timing estimator 324 operates as described above to provide a timing signal that is used to center the FIR filter. Correlator 322 performs the cross-correlation between received sample vector y and the transmitted symbol vector (represented by $X^H$) to provide the correlated result $X^H y$, as shown in equation (14). A scaler 326 then scales the correlated result by a factor of 1/P to provide the system response estimate $h_d$. A post-processor 328 then pre-multiplies the system response estimate $h_d$ with the inverse autocorrelation matrix $R_{\tilde{n}\tilde{n}}^{-1}$ to obtain the coefficients for the FIR filter.

Figure 4:
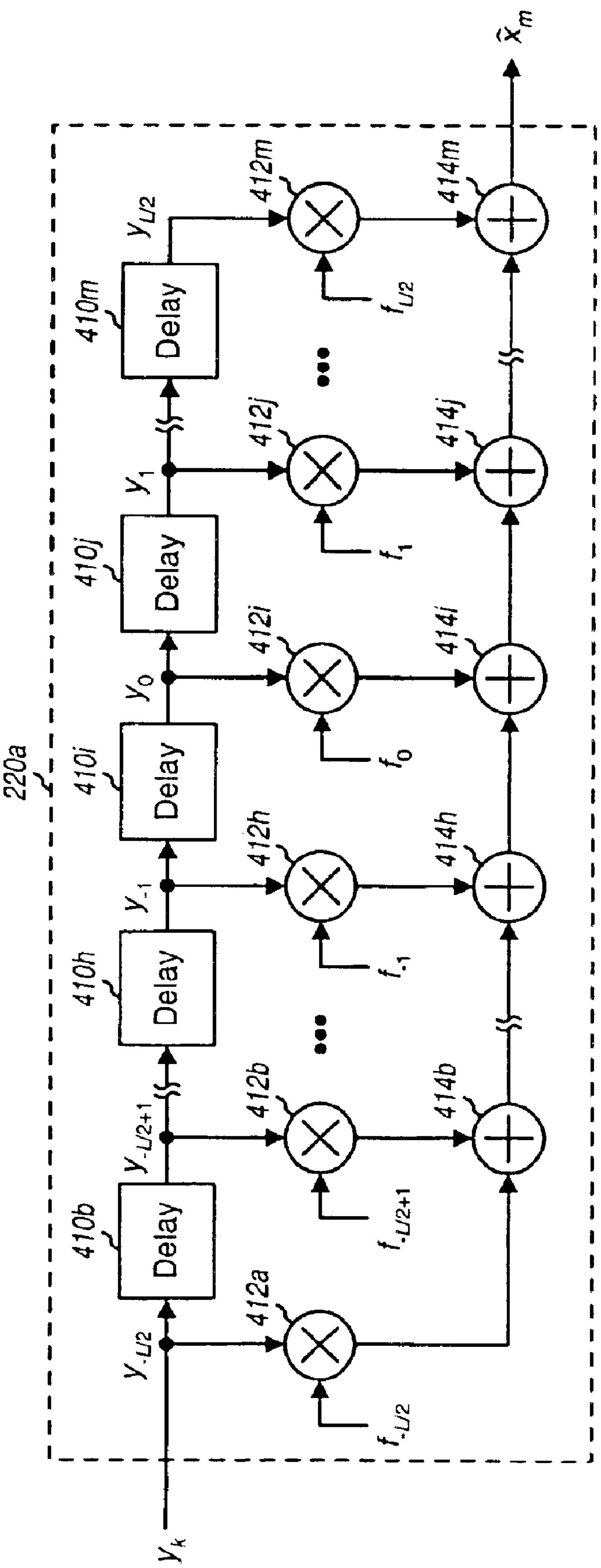
FIG. 4 is a block diagram of a FIR filter.

FIG. 4 is a block diagram of a FIR filter 220*a*, which is an embodiment of FIR filter 220 in FIG. 2. FIR filter 220*a* includes L+1 taps, with each tap corresponding to a received sample for a particular sample period. Each tap is associated with a respective coefficient provided by channel estimator 230.

The received samples $y_k$ are provided to L delay elements 410*b* through 410*m*. Each delay element provides one sample period ($T_s$) of delay. As noted above, the sample rate is typically selected to be higher than the symbol rate to avoid aliasing of the signal spectrum. However, it is also desirable to select a sample rate that is as close to the symbol rate as possible so that fewer number of filter taps are required to cover a given delay spread in the total system impulse response, which would then simplify the FIR filter and channel estimator. In general, the sample rate may be selected based on the characteristics of the system where the matched filter receiver will be used.

For each symbol period m, the received samples for the L+1 taps are provided to multipliers 412*a* through 412*m*. Each multiplier receives a respective received sample $y_i$ and a respective filter coefficient $f_i$, where i is the tap index and i=L/2 . . . −1, 0, 1, . . . L/2. Each multiplier 412 then multiplies its received sample $y_i$ with its assigned coefficient $f_i$ to provide a corresponding scaled sample. The L+1 scaled samples from multipliers 412*a* through 412*m* are then summed by adders 414*b* through 414*m* to provide a demodulated symbol $\hat{x}_m$ for that symbol period.

The demodulated symbol $\hat{x}_m$ may be computed as shown in equation (12), which may also be expressed as:

$$\hat{x}_m = \sum_{i=m-L/2}^{m+L/2} f_i^* y_i. \quad \text{Eq (17)}$$

For simplicity, a FIR filter has been specifically described for use to filter the received samples. However, other types of digital filter may also be used, and this is within the scope of the invention.

Figure 5:
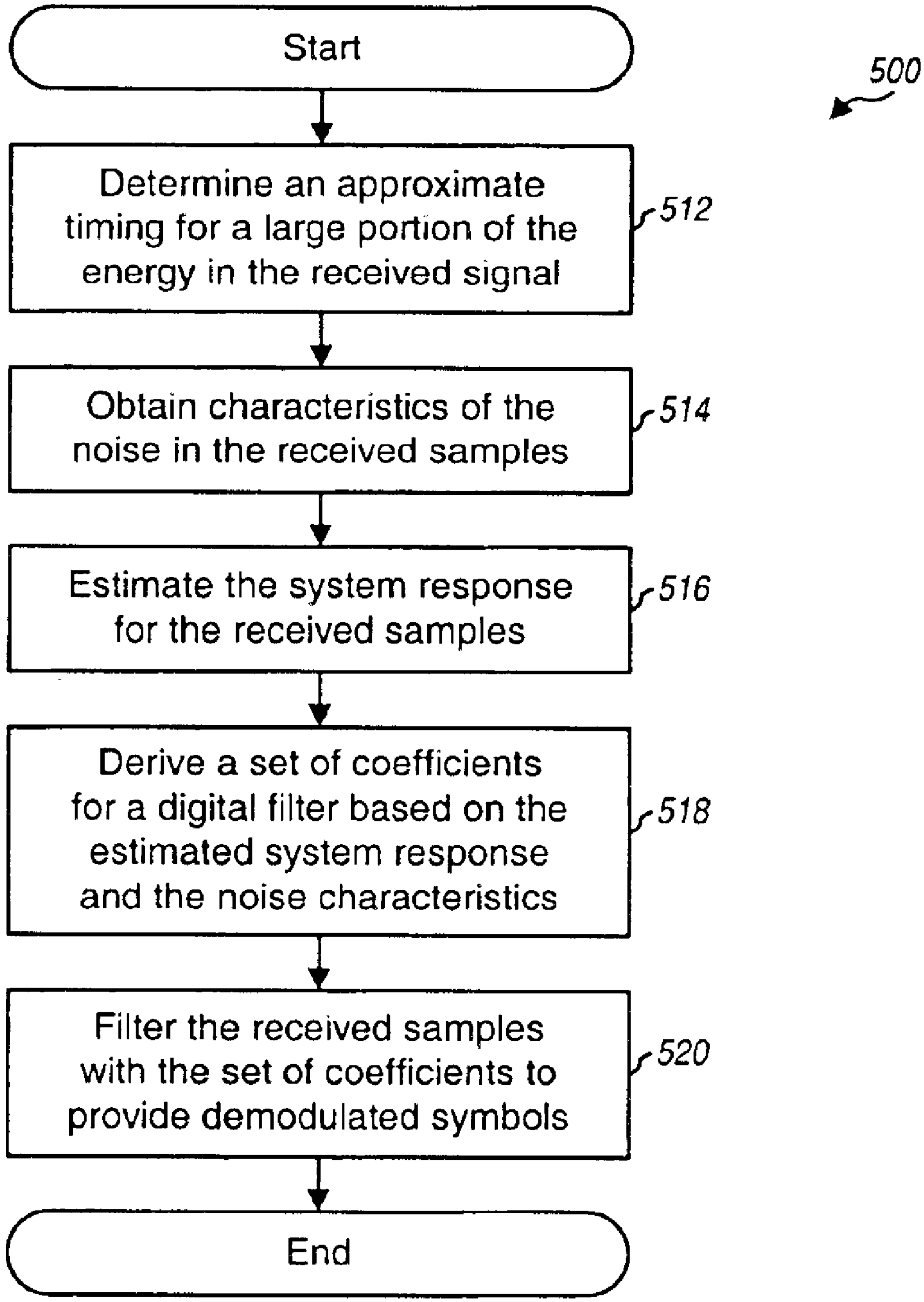
FIG. 5 is a flow diagram of a process for processing a received signal in the wireless communication system.

FIG. 5 is a flow diagram of an embodiment of a process 500 for processing a received signal in a wireless (e.g., CDMA) communication system. Initially, the timing corresponding to the approximate center of the bulk of the energy in the received signal is determined (step 512). This timing is used to center a digital (e.g., FIR) filter.

The non-parametric matched filter receiver does not assume that the input noise is white, which is an assumption made by the rake receiver. Thus, the characteristics of the noise in the received samples are obtained (step 514). The noise may be characterized by the autocorrelation matrix $R_{\tilde{n}\tilde{n}}^{-1}$. Since this matrix is based on the receiver impulse response r(t), which normally does not change over time, it may be pre-computed and stored.

The system response for the received samples is then estimated (step 516). The system response estimation may be performed using the BLU estimator, the correlating estimator, or some other type of estimator. For the correlating estimator, the received samples are correlated with known values for these samples to obtain the estimated system response. And for the BLU estimator, the received samples are pre-processed to approximately whiten the noise, then correlated with known values for these samples to obtain correlated result, which is further applied with a correction factor to obtain the estimated system response. The correction factor accounts for coloration of the noise and may also be pre-computed and stored. In an embodiment, since the correction factor has more impact on performance at high SINR, it may be selectively applied based on an estimate of the received signal quality.

The estimation of the system response is typically performed based on pilot symbols transmitted along with the data. If the pilot is transmitted in a time multiplexed manner (such as for the forward link in IS-856), then the system response may be estimated in blocks and may start fresh for each pilot burst. Alternatively, if the pilot is transmitted in a continuous manner (such as for the forward link in IS-95 and the reverse link in IS-856), then the system response may be estimated using a sliding window.

A set of coefficients for the digital filter is then derived based on the estimated system response and the determined noise characteristics (step 518). This may be performed as shown in equation (11). The received samples are then filtered by the digital filter with the set of coefficients to provide demodulated symbols (step 520).

The non-parametric matched filter receiver can provide improved performance over the conventional rake receiver for various operating scenarios. For example, the matched filter receiver can handle a communication channel defined by a finite number of multipath components whereby some or all of them are un-resolvable in time delay. Such a phenomenon is commonly referred to as sub-chip multipath or "fat path", which occurs when the spacing between the time delays of the multipath components is smaller than one chip period.

In contrast, the conventional rake receiver is normally not able to handle multipath components that are separated by less than one chip period. Moreover, complicated rules and states are normally implemented in the control unit of the rake receiver to deal with sub-chip multipath components. As a result of all of this, the performance of the rake receiver may be extremely difficult to evaluate and can further be shown to be far from that of an optimal non-parametric matched filter receiver under sub-chip multipath conditions.

The non-parametric matched filter receiver described herein thus provides a number of advantages, including:

Improved performance for many channel conditions (especially for high geometry cases) because of its ability to handle any channel model, particularly sub-chip multipath channels, as described in further detail below.

Reduction in circuit complexity over the conventional rake receiver because of (1) the elimination of the "finger assignment" functions, which may comprise the most complex unit of the rake receiver, and (2) significant reduction in the searcher, whose only function for the matched filter receiver is to locate the bulk of the channel energy.

Analytical tractability and hence accurate assessment of performance.

PERFORMANCE

In the following description, the term "geometry" is used to denote the bound of the non-parametric matched filter receiver. The matched filter bound is (in general) the unachievable SINR that results from being able to combine all of the energy in the system without enhancing the Gaussian noise and without suffering from any multipath or self-intersymbol interference (ISI) degradation. The geometry for a system may be expressed as:

$$\text{geometry} = \frac{\int \|p(t)*c(t)\|^2 dt}{N_o}. \quad \text{Eq (18)}$$

The SINR achieved by a given implementation of the non-parametric matched filter receiver is lower than the geometry. The amount of degradation for different types of channel estimator is shown below.

Figure 6A:
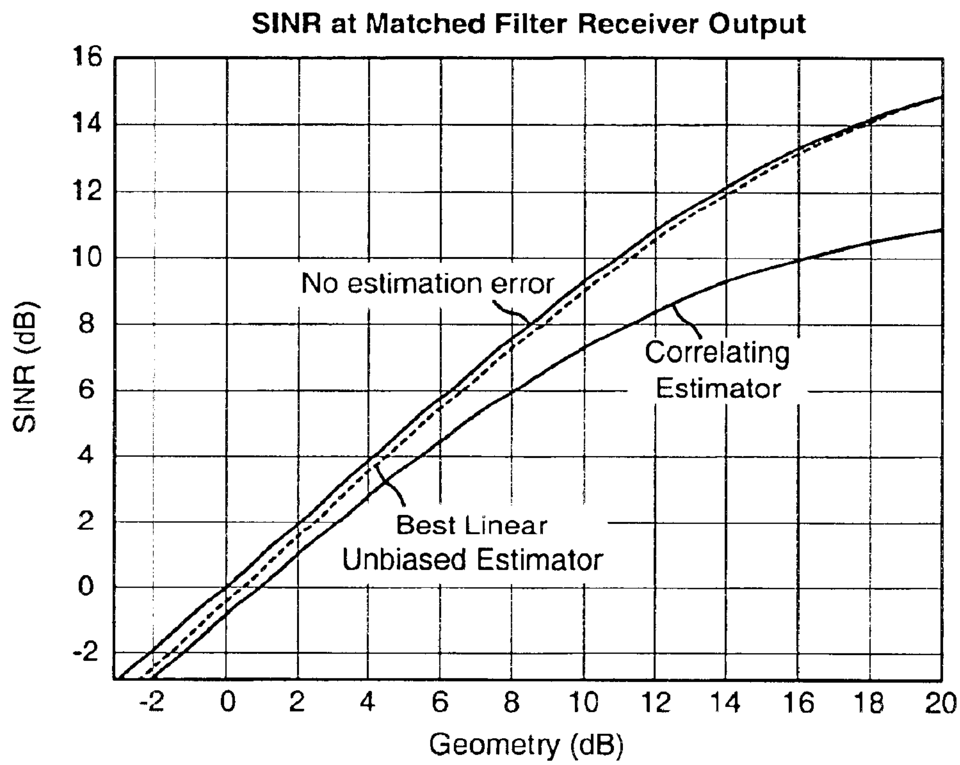
FIGS. 6A through 6C show plots of the performance of the non-parametric matched filter receiver.

FIG. 6A shows plots of the SINRs achieved at the output of the matched filter receiver for the two channel estimators described above, for high geometry cases. The simulation was performed for the forward link of a system that implements IS-856, which is also commonly known as High Data Rate (HDR). The forward link of IS-856 supports variable data rates up to 2.4 Mbps on a 1.25 MHz bandwidth. The SINR at the output of the matched filter receiver required to achieve a 1 percent frame error rate (FER) is approximately 10 dB for the highest rate.

Three plots are shown in FIG. 6A for (1) an ideal non-parametric matched filter receiver without any estimation error for h, (2) a matched filter receiver with the BLU estimator, and (3) a matched filter receiver with the correlating estimator. The FIR filter in the matched filter receiver has 13 taps that are symbol-spaced (i.e., the delay for each tap is one symbol period). For a CDMA system such as IS-856, one transmitted symbol may be sent for each PN chip. In this case, the simulated FIR filter has 13 chip-spaced taps.

The plots in FIG. 6A are derived based on computer simulation for a single path channel. For the forward link in IS-856, data is transmitted in frames, each of which is 2048 chips long. Each frame includes two time multiplexed pilot bursts, with one pilot burst being located at the center of each half slot in the frame. Each pilot burst covers 96 chips. In the simulation, the system response is estimated with P=192 chips (or two pilot bursts) for the high geometry cases.

As shown in FIG. 6A, the performance of the matched filter receiver with the BLU estimator approaches that of a matched filter receiver without any estimation errors over the entire range of geometries shown in FIG. 6A. The performance of the matched filter receiver with the correlating estimator approaches that of the matched filter receiver with the BLU estimator at lower geometries but diverges at higher geometries.

In high geometry cases, the type of estimator used for the matched filter receiver plays a significant role in the performance of the receiver. The difference in performance between the two estimators increases for increasing geometry. This is consistent with the fact that the covariance matrix $R_{\Delta_b\Delta_b}$ of the BLU estimator does not depend on the channel impulse response c(t) (as shown in equation (10)) whereas the covariance matrix $R_{\Delta_d\Delta_d}$ for the correlating estimator does depend on c(t), which is included in h (as shown in equation (16)). For higher geometries, the ISI becomes more important than the Gaussian input noise and ends up being the limiting factor in the accuracy of the correlating estimator.

Figure 6B:
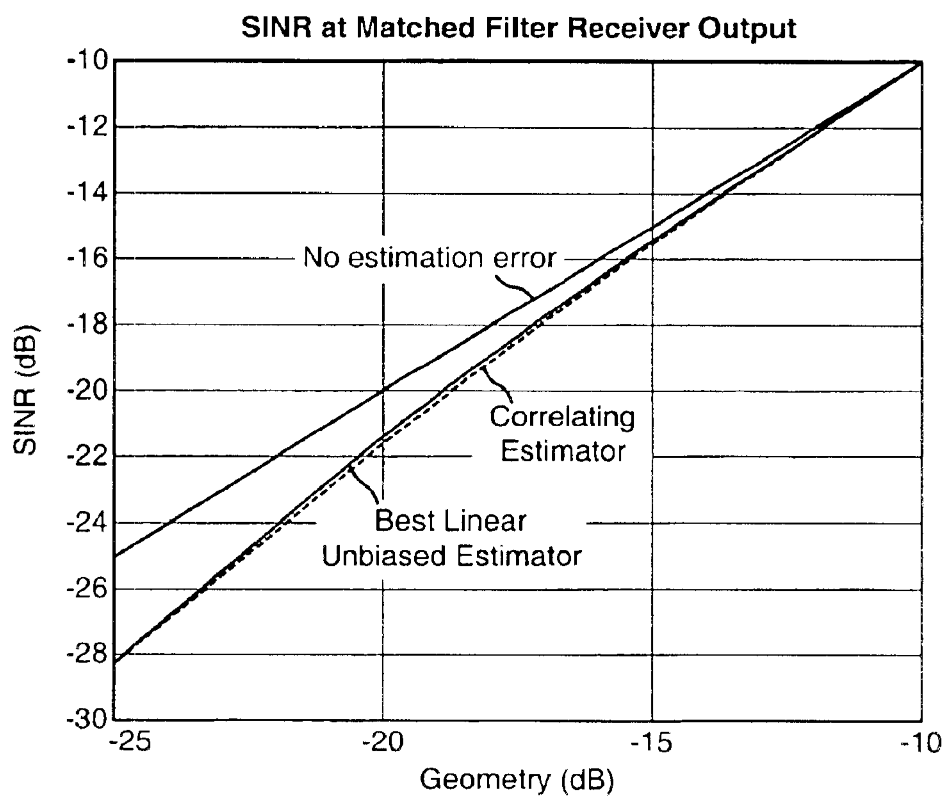

FIG. 6B shows plots of the signal-to-interference-and-noise ratio (SINRs) achieved at the output of the matched filter receiver for the two channel estimators described above, for low geometry cases. The simulation was performed for the reverse link of the IS-856 system, which transmits a continuous but low-power pilot on the reverse link.

Again, three plots are shown in FIG. 6B for the three different non-parametric matched filter receivers evaluated for FIG. 6A. The same FIR filter with 13 symbol-spaced taps is also used for all three matched filter receivers. The plots in FIG. 6B are derived based on computer simulation for a single path channel. However, the system response is estimated with P=3072 chips for the low geometry cases.

For low geometry cases, the intersymbol interference (ISI) component is negligible and the Gaussian noise component dominates. Both channel estimators then have similar performance. However, since the correlating estimator is simpler to implement, it may be advantageously used for low geometry cases to obtain a reduction in complexity (over the BLU estimator) without incurring a performance penalty.

It can be shown that a non-parametric matched filter receiver can outperform a rake receiver for many types of channel. In a severe fading channel, the multipath components may be spaced apart by less than one chip (i.e., sub-chip spacing). The conventional rake receiver suffers a performance loss under this operating environment due to an inability to estimate the true delay of each multipath component. Moreover, for certain types of channels, a path-based model does not accurately describe the channel, and the concept of time tracking discrete multipath components is flawed.

A simulation was performed for a system that uses the IS-856 forward link frame structure. The transmitter uses IS-95 pulse and signaling periods. In the simulation, the receiver employs an input filter perfectly matched to the transmit pulse followed by either a conventional rake receiver or a non-parametric matched filter receiver with the correlating estimator. For the matched filter receiver, the coefficients are updated at each half slot using the correlating estimator on 192 chips of pilot (i.e., two pilot bursts—the current and preceding pilot bursts). The same number of pilot chips is used in the rake receiver to determine the weights and time offsets for the individual fingers (or demodulation elements). The time tracking for each finger was performed by a delay lock loop that uses an early-late detector and a first order loop filter. The SINR was measured at the output of the rake receiver and matched filter receiver.

The simulated channel follows an exponentially decaying profile on relative power given by:

$$A(\tau)=e^{-0.4\tau}, \quad \text{Eq(19)}$$

where the time variable $\tau$ is in units of chips. The geometry for the simulation was −6 dB. The FIR filter used for the matched filter receiver has 17 taps that are spaced apart by ¾ chip.

The rake receiver observes a "blob" of energy more than three chips wide. Assigning and maintaining fingers on this energy blob was a cumbersome task. For comparison purposes, the rake receiver was run three times on the same data. Only one finger was maintained on the received signal throughout the first run, two fingers were maintained in the second run, and three fingers were maintained in the third run.

Each finger independently tracks the timing of its assigned multipath component. However, for the runs with multiple fingers assigned to the received signal, a rule was implemented whereby the fingers were not allowed to approach each other by less than one chip, with the weaker finger being pushed away from the stronger finger. In fading scenarios, one of the main challenges in assigning fingers close to each other is the possibility of these fingers "merging" together. The merged fingers would then end up tracking the same multipath component, and the gain from having two fingers disappears.

Figure 6C:
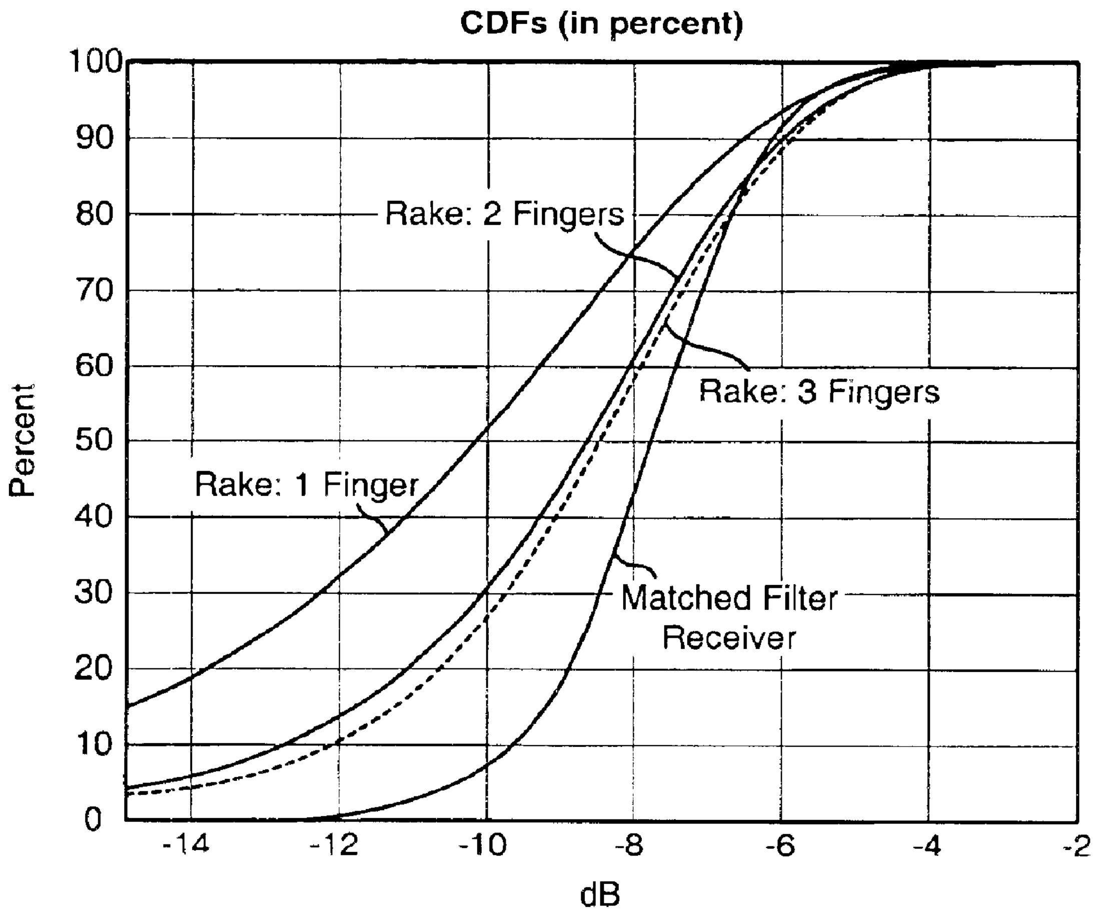

FIG. 6C shows four plots comparing the performance of the matched filter receiver against that of the rake receiver. The plots are for cumulative density functions (CDFs) of the SINR at the output of the receivers. For a given SINRx, the CDF value at that SINRx indicates the percentage of time a given receiver achieves that SINRx or worse. Thus, for any value of SINR, a lower value for the CDF indicates better performance.

As shown by these plots, the rake receiver can outperform the matched filter receiver in a small portion of the cases. The main reasons for this appear to come from using the non-optimum correlating estimator and having an excessive number of taps. The extra filter taps can cause a bigger mean loss in SINR for the matched filter receiver than for the rake receiver, which has fewer parameters to estimate. Both of these apparent problems can be remedied by implementing the best linear unbiased (BLU) estimator and by using an algorithm that can select the length of the FIR filter based on an estimated time spread of the channel impulse response.

However, even under these unfavorable settings, the matched filter receiver shows its improvements over the rake receiver even as the number of fingers increases. The channel in the simulation contains most of its energy within four chips, and it is an optimistic assumption that three fingers can be assigned and maintained in such a channel. It should also be noted that the gain going from two to three fingers is relatively small. This is because the path model is not satisfied for this type of channel, and assigning more fingers does not close the gap in performance between the rake receiver and the matched filter receiver.

The non-parametric matched filter described herein may be used for various types of wireless communication systems. For example, this receiver may be used for CDMA, TDMA, and FDMA communication systems, and for wireless LAN systems such as those that conform to the IEEE standard 802.11b. In particular, the non-parametric matched filter receiver can be advantageously used in CDMA systems (e.g., IS-95, cdma2000, IS-856, W-CDMA, and other CDMA systems) where it can replace the conventional rake receiver and provide the advantages noted above.

The non-parametric matched filter receiver described herein may be implemented by various means. For example, this receiver may be implemented in hardware, software, or a combination thereof. For a hardware implementation, the elements used to implement the receiver (e.g., the FIR filter and channel estimator) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the non-parametric matched filter receiver may be implemented with modules (e.g., procedures, functions, and so on) that perform the functions described herein. The software codes may be stored in a memory unit (e.g., memory 172 in FIGS. 1 and 2) and executed by a processor (e.g., controller 170). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for processing a received signal in a CDMA communication system, comprising:

providing a timing signal to center a digital filer;

obtaining at the digital filter characteristics of noise in samples for data symbols derived from the received signal;

obtaining at a channel estimator characteristics of noise in samples for pilot symbols derived from the received signal;

estimating a system response for the samples for pilot symbols;

deriving a set of coefficients for the digital filter based on the estimated system response and the determined noise characteristics in samples for pilot symbols; and filtering the samples for data symbols with the set of coefficients.

2. The method of claim 1, wherein the noise is characterized by an autocorrelation matrix.

3. The method of claim 2, wherein values for the autocorrelation matrix are pre-computed.

4. The method of claim 1, wherein the system response is estimated with a best linear unbiased estimator.

5. The method of claim 1, wherein the system response is estimated with a correlating estimator.

6. The method of claim 1, wherein the set of coefficients f is derived as:

$$f = R_{nn}^{-1}\hat{h}.$$

where R is an autocorrelation matrix for the noise, and $\hat{h}$ is the estimated system response.

7. The method of claim 1, wherein the estimating includes correlating the samples for pilot symbols with known values for the samples for pilot symbols to obtain the estimated system response.

8. The method of claim 1, wherein the estimating includes pre-processing the samples for pilot symbols to approximately whiten the noise;

correlating the pre-processed samples with known values for the samples for pilot symbols to obtain correlated results, and applying a correction factor to the correlated results to obtain the estimated system response.

9. The method of claim 8, wherein the correction factor accounts for coloration of the noise.

10. The method of claim 8, wherein the correction factor is pre-computed.

11. The method of claim 1, further comprising:

determining timing corresponding to an approximate center for a large portion of the energy in the received signal, and wherein the digital filter is centered based on the determined timing.

12. The method of claim 11, wherein the determined timing corresponds to the timing of a strongest multipath component found in the received signal.

13. A method for processing a received signal in a wireless communication system, comprising:

providing a timing signal to center a digital filter;

obtaining at the digital filter characteristics of noise in samples for data symbols derived from the received signal;

obtaining at a channel estimator characteristics of noise in samples for pilot symbols derived from the received signal;

estimating a system response for the samples for pilot symbols;

deriving a set of coefficients for the digital filter based on the estimated system response and the determined noise characteristics in samples for pilot symbols and using a best linear unbiased estimator or a correlating estimator; and filtering the samples for data symbols with the set of coefficients.

14. The method of claim 13, further comprising:

determining timing corresponding to an approximate center for a large portion of the energy in the received signal, and wherein the digital filter is centered based on the determined timing.

15. A memory communicatively coupled to a digital signal processing device (DSPD) capable of interpreting digital information to:

provide a timing signal to center a digital filter;

obtain at the digital filter characteristics of noise in samples for data symbols derived from a received signal in a wireless communication system;

obtain at a channel estimator characteristics of noise in samples for pilot symbols derived from the received signal;

estimate a system response for the samples for pilot symbols;

derive a set of coefficients for the digital filter based on the estimated system response and the determined noise characteristics in samples for pilot symbols and using a best linear unbiased estimator or a correlating estimator; and filter the samples for data symbols with the digital filter using the set of coefficients.

16. An apparatus operable to process a received signal in a CDMA communication system, comprising:

means for providing a timing signal to center a digital filter;

means for obtaining at the digital filter characteristics of noise in samples for data symbols derived from the received signal;

means for obtaining at a channel estimator characteristics of noise in samples for pilot symbols derived from the received signal;

means for estimating a system response for the samples for pilot symbols;

means for deriving a set of coefficients for the digital filter based on the estimated system response and the determined noise characteristics in samples for pilot symbols; and means for filtering the samples for data symbols with the set of coefficients.

17. A receiver in a CDMA communication system, comprising:

a timing signal to center a digital filter;

the digital filter operative to filter samples for data symbols derived from the received signal with a set of coefficients; and a channel estimator operative to obtain characteristics of noise in the samples for pilot symbols, estimate a system response for the samples for pilot symbols, and derive the set of coefficients for the digital filter based on the estimated system response and the determined noise characteristics.

18. The receiver of claim 17, wherein the channel estimator implements a best linear unbiased estimator.

19. The receiver of claim 17, wherein the channel estimator implements a correlating estimator.

20. The receiver of claim 17, wherein the channel estimator is further operative to determine timing corresponding to an approximate center for a large portion of the energy in the received signal, and wherein the digital filter is centered based on the determined timing.

21. The receiver of claim 17, wherein the estimated system response is derived based on a correction factor to account for coloration of the noise.

22. The receiver of claim 21, further comprising:

a memory operative to store pre-computed values for the correction factor.

23. The receiver of claim 17, wherein the digital filter is a finite impulse response (FIR) filter.

24. The receiver of claim 17 and operative for a communication channel with high signal-to-noise-and-interference ratio (SINR).

25. The receiver of claim 17, wherein the received signal is a forward link signal in the CDMA system.

26. A terminal comprising the receiver of claim 17.

* * * * *